(12) United States Patent
Sorenson

(10) Patent No.: US 6,783,678 B2
(45) Date of Patent: Aug. 31, 2004

(54) HALOGENATED SOLVENT REMEDIATION

(75) Inventor: Kent S. Sorenson, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 336 days.

(21) Appl. No.: 09/895,430

(22) Filed: Jun. 29, 2001

(65) Prior Publication Data

US 2002/0020665 A1 Feb. 21, 2002

Related U.S. Application Data

(60) Provisional application No. 60/214,957, filed on Jun. 29, 2000, and provisional application No. 60/233,414, filed on Sep. 18, 2000.

(51) Int. Cl.[7] .................................................. C02F 3/00
(52) U.S. Cl. ..................................... 210/610; 435/262.5
(58) Field of Search ......................... 435/262.5; 210/610

(56) References Cited

U.S. PATENT DOCUMENTS

| | | | |
|---|---|---|---|
| 4,585,482 A | | 4/1986 | Tice et al. ................ 106/15.05 |
| 5,264,018 A | | 11/1993 | Koenigsberg et al. .......... 71/63 |
| 5,277,815 A | | 1/1994 | Beeman ....................... 210/605 |
| 5,395,419 A | | 3/1995 | Farone et al. ................... 71/63 |
| 5,434,241 A | | 7/1995 | Kim et al. .................... 528/354 |
| 5,464,771 A | * | 11/1995 | Bryant et al. ............. 435/262.5 |
| 5,516,688 A | | 5/1996 | Rothmel .................... 435/262.5 |
| 5,560,904 A | | 10/1996 | Laugier et al. ........... 424/78.08 |
| 5,587,317 A | | 12/1996 | Odom ....................... 435/262.5 |
| 5,658,795 A | | 8/1997 | Kato et al. ............... 435/262.5 |
| 5,833,855 A | | 11/1998 | Saunders ..................... 210/611 |
| 5,840,571 A | | 11/1998 | Beeman et al. .......... 435/262.5 |
| 5,932,472 A | | 8/1999 | Abdullah .................. 435/262.5 |
| 5,993,658 A | | 11/1999 | Kato et al. ................... 210/611 |
| 6,001,252 A | * | 12/1999 | Rice et al. ................... 210/610 |
| 6,265,205 B1 | * | 7/2001 | Hitchens et al. ............. 435/262 |
| 6,420,594 B1 | * | 7/2002 | Farone et al. ................ 560/185 |
| 6,472,198 B1 | * | 10/2002 | Semprini et al. ......... 435/262.5 |
| 6,562,235 B1 | * | 5/2003 | Newell et al. .............. 210/601 |
| 6,589,776 B1 | * | 7/2003 | Harkness .................. 435/262.5 |

FOREIGN PATENT DOCUMENTS

WO    WO 99/24367    5/1999    ............. C02F/1/68

OTHER PUBLICATIONS

Maymo–Gatell, et al, "Isolation of a Bacterium That Reductively Dechlorinates Tetrachoroethene to Ethene," *Science*, vol. 276, pp. 1568–1571.

Fennell, et al., "Comparison of Butyric Acid, Lactic Acid, and Propionic Acid as Hydrogen Donors for the Reductive Dechlorination of Tetrachloroethene," *Environmental Science & Technology*, vol. 31, No. 3, 1997 pp. 918–926.

(List continued on next page.)

*Primary Examiner*—Chester T. Barry
(74) *Attorney, Agent, or Firm*—Clayton Howarth & Cannon

(57) ABSTRACT

Methods for enhancing bioremediation of ground water contaminated with nonaqueous halogenated solvents are disclosed. A preferred method includes adding a composition to the ground water wherein the composition is an electron donor for microbe-mediated reductive dehalogenation of the halogenated solvents and enhances mass transfer of the halogenated solvents from residual source areas into the aqueous phase of the ground water. Illustrative compositions effective in these methods include surfactants such as $C_2$–$C_4$ carboxylic acids and hydroxy acids, salts thereof, esters of $C_2$–$C_4$ carboxylic acids and hydroxy acids, and mixtures thereof. Especially preferred compositions for use in these methods include lactic acid, salts of lactic acid, such as sodium lactate, lactate esters, and mixtures thereof. The microbes are either indigenous to the ground water, or such microbes can be added to the ground water in addition to the composition.

52 Claims, 5 Drawing Sheets

OTHER PUBLICATIONS

Fennell, et al, "Modeling the Production of and Competition for Hydrogen in a Dechlorinating Culture," *Environmental Science & Technology*, vol. 32, No. 16, 1998 pp. 2450–2460.

Carr, et al., "Effect of Dechlorinating Bacteria on the Longevity and Composition of PCT–Containing Nonaqueous Phase Liquids under Equilibrium Dissolution Conditions," *Environmental Science & Technology*, vol. 34, No. 6, 2000 pp. 1088–1094.

McCray, et al, "Cyclodextrin–Enhanced Solubilization of Organic Contaminants with Implications for Aquifer Remediation," Winter 2000 GWMR, pp. 94–103.

Bouwer, et al, "Transformations of 1– and 2–Carbon Halogenated Aliphatic Organic Compounds Under Methanogenic Conditions," *Applied and Environmental Microbiology*, Apr. 1983 pp. 1286–1294.

Vogel, et al, "Biotransformation of Tetrachloroethylene to Trichloroethylene, Dichloroethylene, Vinyl Chloride, and Carbon Dioxide under Methanogenic Conditions," *Applied and Environmental Microbiology*, May 1985 pp. 1080–1083.

Freedman, et al., "Biological Reductive Dechlorination of Tetrachloroethylene and Trichloroethylene to Ethylene under Methanogenic Conditions," *Applied and Environmental Microbiology*, Sep. 1989 pp. 2144–2151.

Freedman, et al., "Biological Reductive Dechlorination of Tetrachloroethylene and Trichloroethylene to Ethylene under Methanogenic Conditions," *Applied and Environmental Microbiology*, Sep. 1989 pp. 2144–2151.

DiStefano, et al, "Reductive Dechlorination of High Concentration of Tetrachoroethene to Ethene by an Anaerobic Enrichment Culture in the Absence of Methanogenesis," *Applied and Environmental Microbiology*, Aug 1991 pp. 2287–2292.

DiStefano, et al, "Hydrogen as an Electron Donor for Dechlorination of Tetrachloroethene by an Anaerobic Mixed Culture," *Applied and Environmental Microbiology*, Nov. 1992 pp. 3622–3629.

Holliger, et al, "A Highly Purified Enrichment Culture Couples the Reductive Dechlorination of Tetrachloroethene to Growth," *Applied and Environmental Microbiology*, Sep. 1993 pp. 2991–2997.

Howze, "Test at TAN Bioremediation of Groundwater Plume Shows Promise," *iNEWs*, Jul. 6, 1999.

Sorenseon, K. S., "Intrinsic and Enhanced In Situ Biodegradation of Trichloroethene in Deep, Fractured Basalt Aquifer," *Dissertation*, May 2000.

* cited by examiner

HALOGENATED SOLVENT REMEDIATION

RELATED APPLICATIONS

This application claims the benefit of U.S. Provisional Application No. 60/214,957, filed Jun. 29, 2000, and U.S. Provisional Application No. 60/233,414, filed Sep. 18, 2000.

CONTRACTUAL ORIGIN OF THE INVENTION

This invention was made with United States Government support under Contract No. DE-AC07-99ID13727 awarded by the United States Department of Energy. The United States Government has certain rights in the invention.

BACKGROUND OF THE INVENTION

This invention relates to remediation of environmental contamination. More particularly, the invention relates to methods for accelerating or enhancing in situ dehalogenation of nonaqueous halogenated solvents in ground water. These methods involve adding to the contaminated ground water a composition of matter that both functions as an electron donor for halorespiration processes carried out by indigenous or exogenously supplied bacteria, wherein the nonaqueous halogenated solvents are dehalogenated and degraded to innocuous compounds, and promotes mass transfer of the nonaqueous halogenated solvents from a source into the ground water where such solvents can be broken down.

For many years little care was taken in the handling of organic solvents and other materials that were used in industry and at government installations, such as military bases. Because of poor handling techniques and, occasionally, intentional dumping, many industrial sites and military bases now have contaminated areas containing relatively high concentrations of these contaminants. Chlorinated solvents, such as trichloroethylene (TCE), perchloroethylene (PCE), and other types of liquids, are common at such sites, and if not removed can infiltrate groundwater supplies, rendering the water unfit for consumption and other uses.

A variety of techniques have been used to promote the removal of such chemical contaminants, both from the soil and from the ground water. The principle method of ground water remediation currently used where dense, non-aqueous phase liquids (DNAPLs) are involved is what is commonly referred to as "pump-and-treat" remediation. According to this method, wells are drilled into the contaminated area and contaminated ground water is pumped above the surface, where it is treated to remove the contaminants.

The limitations of the pump-and-treat method have been documented in articles such as D. M. Mackay & J. A. Cherry, Groundwater Contamination: Pump and Treat Remediation, 23 Environ. Sci. Technol. 630–636 (1989). The authors of this article concluded that pump-and-treat remediation can only be relied on to contain ground water contamination through the manipulation of hydraulic gradients within an aquifer. The reasons for the failure of the pump-and-treat method to decontaminate aquifers are rooted in the limited aqueous solubility of many DNAPLs in ground water and other processes involving contaminant desorption and diffusion. Because of the low aqueous solubility of most DNAPLs, their removal by ground water extraction requires exceptionally long periods of time.

Due to the general impracticability of the pump-and-treat method, considerable attention has been paid recently to other methods for effecting remediation. One such process is commonly referred to as enhanced solubilization. This method uses micellar surfactants to increase the effective solubility of the DNAPLs to accelerate the rate of removal. The mechanism of solubilization displayed by surfactants arises from the formation of microemulsions by the surfactants, water, and the solubilized DNAPLs. For example, Table 1 shows solubilization of PCE by various nonionic and anionic surfactants. These data indicate that even dilute surfactants can significantly increase the aqueous solubility of PCE.

TABLE 1

| Surfactant | Surfactant Concentration | PCE Solubilized (mg/l) |
|---|---|---|
| Water | 0% | 240 |
| Nonylphenol ethoxylate and its phosphate ester (1:1) | 2% | 11,700 |
| Sodium diamyl and dioctyl sulfosuccinates (1:1) in 500 mg $CaCl_2$/l | 4% | 85,000 |
| Nonylphenol ethoxylate | 1% | 1,300 |

A serious drawback with the surfactant-enhanced aquifer remediation is that the vertical mobility of the solubilized DNAPLs substantially requires that an aquiclude be present to catch any solubilized contaminant that migrates vertically. Many aquifers, however, lack such an aquiclude. If the traditional surfactant-enhanced aquifer remediation method were to be used with an aquifer lacking an aquiclude, there is a significant risk that the solubilized DNAPLs will spread vertically and contaminate an increasingly large volume. Another drawback of surfactant-enhanced aquifer remediation is the need to pump high concentrations of contaminated water above ground, which results in exposure risks to workers and the environment, and the need to dispose or recycle the surfactant.

Another method for effecting remediation of ground water contaminated with DNAPLs is known as enhanced bioremediation. Enhanced bioremediation, as opposed to intrinsic bioremediation, of halogenated solvent-contaminated ground water falls into the two broad categories of aerobic and anaerobic bioremediation. The aerobic processes, regardless of whether they are carried out in situ or in a bioreactor, require addition of (1) oxygen as the electron acceptor for catabolism of the halogenated solvents, and (2) a carbon source, such as methane, propane, phenol, toluene, or butane. The utilization of an appropriate carbon source induces an enzyme that fortuitously degrades many halogenated solvents, but without any immediate benefit to the microorganisms involved. This process has been applied in situ to aqueous contamination in several instances, and at least one patent has been granted for this approach (U.S. Pat. No. 5,384,048). It has also been used to treat aqueous contamination in above-ground bioreactors with numerous variations, especially using proprietary microorganisms and nutrient mixes. Many patents have been granted in this area, e.g., U.S. Pat. Nos. 5,057,221; 5,962,305; 5,945,331.

Anaerobic bioremediation of halogenated solvents is a fundamentally different process than aerobic bioremediation. Under appropriate anaerobic conditions, chlorinated solvents can be used directly by some microorganisms as electron acceptors through a process that has come to be known as "chlororespiration," or, more generally, "halorespiration." D. L. Freedman & J. M. Gossett, Biological Reductive Dechlorination of Tetrachloroethylene and Trichloroethylene to Ethylene Under Methanogenic Conditions, 55 Applied Environ. Microbiol. 2144–2155 (1989), first published the complete degradation pathway for chlorinated ethenes to ethene. In the following years, several publications reported evidence that the degradation could be achieved through microbial respiration, indicating that the microorganisms could actually grow by using chlorinated solvents directly as electron acceptors. The primary requirement to facilitate this process is the addition of a suitable electron donor or carbon source. Many electron donors have been described in the literature, including acetate, lactate, propionate, butyrate, formate, ethanol, hydrogen, and many others. U.S. Pat. No. 5,277,815 issued in 1994 for in situ electron donor addition along with control of redox conditions to effect the desired end products. U.S. Pat. No. 5,578,210 issued later for enhanced anaerobic in situ bioremediation using "biotransformation enhancing agents," i.e., electron donors such as propylene glycol, glycerol, glutamate, a mixture of proteose peptone, beef extract, yeast extract, malt extract, dextrose, and ascorbic acid, and mixtures thereof. Based primarily on what was publicly available in the scientific literature, studies of enhanced anaerobic in situ bioremediation of chlorinated solvents began in the mid-1990s. This approach generally includes electron donor addition, sometimes with other micronutrients, to facilitate biotransformation of aqueous-phase contaminants. To date, only a few large-scale studies have been published in the peer-reviewed literature, but environmental consulting companies and remediation contractors are increasingly using the general approach.

With one very recent exception, discussed below, all of the work done in this area to date has focused on the biodegradation of aqueous contaminants, because microorganisms cannot directly degrade nonaqueous contaminants. Consequently, bioremediation is not generally thought to be applicable to sites with residual DNAPLs in the subsurface. Therefore, the technologies currently in use include thermal technologies such as steam stripping, in situ chemical oxidation, surfactant flushing, or co-solvent flushing. Surfactant (or co-solvent) flushing, briefly described above, is a chemical process that aims to facilitate transport of nonaqueous contaminants, but without attention to biodegradation. At many sites, however, the pump-and-treat process continues to be used to hydraulically contain residual source areas although it is almost universally accepted that these systems will have to operate in perpetuity because of their inefficient removal of nonaqueous contaminants.

The notable recent exception to the focus of bioremediation on aqueous contaminants away from residual source areas is a study by C. S. Carr et al., Effect of Dechlorinating Bacteria on the Longevity and Composition of PCE-Containing Nonaqueous Phase Liquids under Equilibrium Dissolution Conditions, 34 Environ. Sci. Technol. 1088–1094 (2000), demonstrating that anaerobic bioremediation of tetrachloroethene (PCE) enhanced mass transfer from the nonaqueous phase to the aqueous phase and significantly shortened the longevity of the nonaqueous source. The mechanisms identified were (1) enhanced dissolution of PCE resulting from the continuous removal of the compound from the aqueous phase by bacteria, and (2) increased solubility of the intermediate chlorinated ethenes relative to PCE, allowing the total moles of chlorinated ethenes in the aqueous phase to increase due to biotransformation. This study is important because it identifies some of the advantages of enhancing mass transfer from the nonaqueous phase to the aqueous phase.

In view of the foregoing, it will be appreciated that providing methods for accelerating or enhancing in situ bioremediation of halogenated solvents in ground water would be a significant advancement in the art.

BRIEF SUMMARY OF THE INVENTION

It is an object of the present invention to provide a method for in situ remediation of DNAPLs in ground water wherein capital costs are low.

It is also an object of the invention to provide a method for in situ remediation of DNAPLs in ground water wherein mass transfer from the nonaqueous phase to the aqueous phase is enhanced.

It is another object of the invention to provide a method for in situ remediation of DNAPLs in ground water wherein the longevity of source areas is shortened.

It is still another object of the invention to provide a method for in situ remediation of DNAPLs in ground water wherein no extraction of contaminated water from the ground is required.

It is yet another object of the invention to provide a method for in situ remediation of DNAPLs in ground water such that the concentrations of the solvents are restored to below regulatory limits and no follow-on remediation activities, other than perhaps monitored natural attenuation, are needed.

It is a still further object of the invention to provide a method for in situ remediation of DNAPLs in ground water wherein the DNAPLs are more rapidly removed from the ground water than with prior art methods and residual source areas are removed.

It is another object of the invention to provide a method for in situ remediation of DNAPLs in ground water wherein transport is facilitated and bioavailability of nonaqueous halogenated solvents is enhanced.

It is still another object of the invention to provide a method for in situ remediation of DNAPLs in ground water wherein the method is sustainable for low cost and has low maintenance requirements.

It is yet another object of the invention to provide a method for in situ remediation of DNAPLs in ground water by adding a composition of matter that is both an electron donor and a surfactant or enhancer of mass transfer.

It is still further an object of the invention to provide a method for remediation of DNAPLs in ground water wherein destruction of the DNAPLs occurs in situ.

It is a yet further object of the invention to provide a method for in situ remediation of DNAPLs in ground water wherein an unobtrusive appearance is provided and it meets with public acceptance.

These and other objects can be addressed by providing a method for enhancing in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein the electron donor enhances mass transfer of the nonaqueous halogenated solvents into solution. The electron donor preferably functions as a surfactant or co-solvent. In cases where the electron donor is a functional surfactant, it is preferably added at a concentration above the critical micelle concentration in water. In cases where the electron donor is a functional co-solvent, there may be no critical micelle concentration, or if there is a critical micelle concentration in water, the electron donor is preferably added at a concentration below such critical micelle concentration. Illustrative electron donors for use in this method include $C_2$–$C_4$ carboxylic acids and hydroxy acids, salts thereof, esters of $C_2$–$C_4$ carboxylic acids and hydroxy acids, and mixtures thereof. In a preferred embodiment of the invention, the electron donor is a member selected from the group consisting of lactic acid, salts thereof, lactate esters, and mixtures thereof. Preferred salts of lactic acid include sodium lactate, potassium lactate, lithium lactate, ammonium lactate, calcium lactate, magnesium lactate, manganese lactate, zinc lactate, ferrous lactate, aluminum lactate, and mixtures thereof, wherein sodium lactate is especially preferred. Illustrative targets of the method include nonaqueous chlorinated solvents, such as perchloroethylene (PCE), trichloroethylene (TCE), dichloroethylene (DCE), vinyl chloride (VC), 1,1,1-trichloroethane (TCA), carbon tetrachloride and less chlorinated derivatives thereof, and mixtures thereof. A preferred aspect of the invention relates to enhancing the reductive dehalogenation activity of indigenous halo-respiring microbes present in the ground water. If halo-respiring microbes are absent or ineffective, then such microbes can be exogenously supplied to the ground water. Preferably, the microbes are bacteria, such as *Dehalococcoides ethenogenes* strain 195, the Pinellas culture, and the like, and mixtures thereof. The method degrades the halogenated solvents into innocuous compounds such as ethylene, ethane, carbon dioxide, water, halogen salts, and mixtures thereof.

A method for enhancing mass transfer of a nonaqueous halogenated solvent present in a nonaqueous residual source of contamination into the aqueous phase comprises adding to the ground water an effective amount of a composition that donates electrons for reductive dehalogenation of the nonaqueous halogenated solvent and functions as a surfactant for solubilizing the nonaqueous halogenated solvent.

BRIEF DESCRIPTION OF THE DRAWINGS

FIG. 3A shows COD (solid line) and electron donor (broken line) concentrations in units of mg/L as a function of time in days. FIG. 3B shows ferrous iron (dotted line), sulfate (solid line), and methane (dashed line) concentrations in units of mg/L as a function of time in days. FIG. 3C shows TCE, cis-DCE, trans-DCE, VC, and ethene concentrations in units of $\mu$mol/L as a function of time in days.

DETAILED DESCRIPTION OF THE INVENTION

Figure 1:
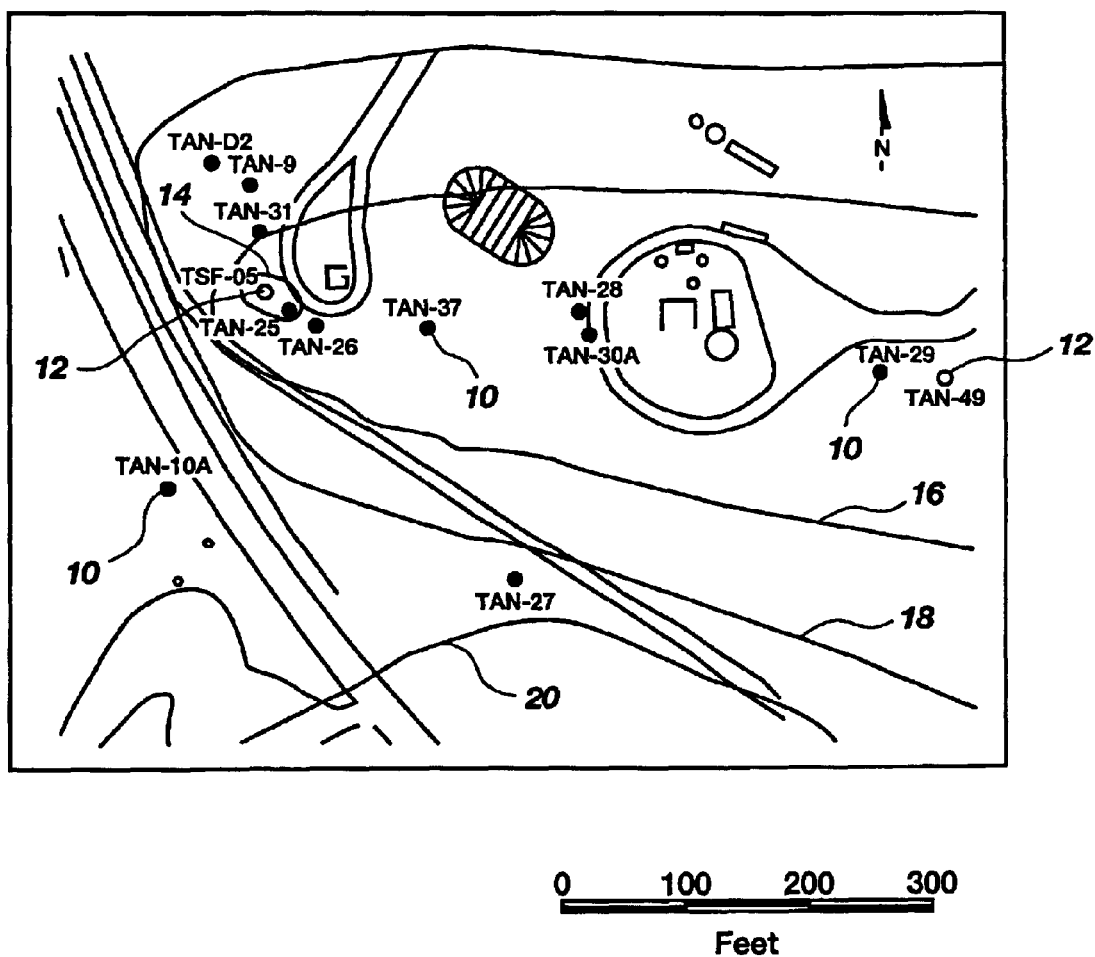
FIG. 1 is a site plan of Test Area North showing the locations of injection wells (○) and monitoring well (●).

Before the present methods for accelerating or enhancing in situ bioremediation of halogenated solvents in ground water are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "an electron donor" includes reference to a mixture of two or more of such electron donors, reference to "a solvent" includes reference to one or more of such solvents, and reference to "a microbe" includes reference to a mixture of two or more of such microbes.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "PCE," "perchloroethylene," "tetrachloroethylene," and "tetrachloroethene" refer to $Cl_2C\!=\!CCl_2$.

As used herein, "TCE," "trichloroethylene," and "trichloroethene" refer to $Cl_2C\!=\!CH\!-\!Cl$.

As used herein, "DCE," "dichloroethylene," and "dichloroethene" refer to $Cl\!-\!HC\!=\!CH\!-\!Cl$.

As used herein, "VC" and "vinyl chloride" refer to $H_2C\!=\!CH\!-\!Cl$.

As used herein, "ethylene" and "ethene" refer to $H_2C\!=\!CH_2$.

As used herein, "chloroethenes" means PCE, TCE, DCE, VC, and mixtures thereof.

As used herein, "biotransformation" means a biological reduction in the number of halogen, e.g., chlorine, atoms covalently bound to an organic compound. For example, PCE can be biotransformed to TCE, which can be biotransformed to DCE, which can be biotransformed to vinyl chloride, which can be biotransformed to ethylene. If the rate of biotransformation is increased by adding an electron donor to the ground water, then the biotransformation is enhanced.

As used herein, "microbe" means a microscopic organism, such as bacteria, protozoa, and some fungi and algae. Bacteria are especially preferred microbes according to the present invention. Biotransformation is enhanced, at least in part, by stimulating indigenous, naturally occurring microbes in the ground water. If indigenous, naturally occurring microbes are not present or are not sufficiently effective, then an appropriate microbe can be added to the ground water, as well as the electron donor of the present invention. The microbe can be added before, with, or after adding the electron donor to the ground water. Preferably, the microbe is an anaerobic or facultatively anaerobic bacterium. Bacteria known to work within the current processes include *Dehalococcoides ethenogenes* strain 195 (X. Maymo-Gatell et al., Isolation of a Bacterium that Reductively Dechlorinates Tetrachloroethene to Ethene, 276 Science 1568–1571 (1997)), the Pinellas culture (M. R. Harkness et al., Use of Bioaugmentation To Stimulate Complete Reductive Dechlorination of Trichloroethene in Dover Soil Columns, 33 Environmental Sci. Technol. 1100–1109 (1999); D. E. Ellis et al., Bioaugmentation for Accelerated In Situ Anaerobic Bioremediation, 34 Environmental Sci. Technol. 2254–2260 (2000)), and the like, and mixtures thereof. Other species, however, are known to function, and the present invention is not limited by the examples provided herein.

As used herein, "surfactant" means a substance that when dissolved in water or an aqueous solution reduces its surface tension or the interfacial tension between it and another liquid. Surfactants are characterized by a structural balance between one or more hydrophilic and hydrophobic groups. This amphiphilic nature causes them to be preferentially adsorbed at air-water, oil-water, and solid-water interfaces, forming oriented monolayers wherein the hydrophilic groups are in the aqueous phase and the hydrocarbon chains are pointed toward the air, in contact with the solid surfaces, or immersed in the oil phase. Surfactants are characterized by a critical micelle concentration (cmc), a concentration at which surfactant molecules begin to aggregate into micelles and above which more micelles are formed. Surfactants enhance solubility of nonpolar compounds in aqueous solutions by providing a microenvironment, i.e., the interior of micelles, where the nonpolar compounds can accumulate. In certain preferred embodiments of the present invention, the electron donor is a surfactant.

As used herein, a "co-solvent" is a solvent present in a minor amount as compared to a solvent with which it is mixed. Co-solvents are like surfactants in that they decrease interfacial tension between two liquid phases, but they generally do not form micelles. Thus, co-solvents enhance solubility, but not to the extent of surfactants. In the context of in situ bioremediation, the rate of enhanced solubilization mediated by a co-solvent or co-solvents is less likely to overwhelm the rate of biotransformation. Thus, in certain preferred embodiments of the invention, the electron donor is a co-solvent.

Chlorinated solvents represent two of the three most common ground water contaminants at hazardous waste sites in the United States, and with their degradation products they account for eight of the top 20. Unfortunately, chlorinated solvents are relatively recalcitrant compounds with low, but toxologically significant, solubilities in water. Historically, the conventional technology for ground water treatment has been pump-and-treat methodology. While the pump-and-treat approach can be useful for achieving hydraulic containment of a ground water contaminated with chlorinated solvents, it has very rarely been successful for restoration, largely because of the heterogeneity of the subsurface (i.e., preferential flow paths) and the presence of nonaqueous phase liquids. This has led to significant research in the last 10 years on in situ technologies for restoration of ground water contaminated with chlorinated solvents.

Residual chlorinated solvent source areas (where non-aqueous contaminants are present) in the subsurface are especially problematic because the combination of low contaminant solubilities and the lack of mixing in typical ground water flow makes them very long-lived (decades to centuries). As discussed above, the common perception that bioremediation cannot effect improvements to the slow mass transfer from the nonaqueous to the aqueous phase has limited its applications to aqueous-phase contaminated ground water plumes. Also mentioned above, the technology categories used for these areas other than pump-and-treat include thermal technologies such as stream-stripping, in situ chemical oxidation, surfactant flushing, or co-solvent flushing. While these approaches generally result in some rapid mass removal of contaminants and have worked to varying degrees, they all share a common disadvantage: they have a high capital cost in the early stages of remediation. In addition, all except chemical oxidation require extraction of contaminants from the ground with subsequent treatment. This creates new exposure pathways and increases costs. Finally, these technologies rarely restore ground water to contaminant concentrations below regulatory limits, so follow-on activities are generally required.

P. V. Roberts et al., Field Study of Organic Water Quality Changes during Ground Water Recharge in the Palo Alto Baylands, 16 Water Resources Research 1025–1035 (1982), reported one of the first field observations suggesting bioremediation of chloroethenes (PCE, TCE, DCE, and VC). E. J. Bouwer & P. L. McCarty, Transformation of 1- and 2-Carbon Halogenated Aliphatic Organic Compounds under Methanogenic Conditions, 45 Applied Environ. Microbiol. 1286–1294 (1983), confirmed biodegradation of PCE and TCE in the laboratory shortly thereafter. F. Parsons et al., Transformations of Tetrachloroethylene and Trichloroethylene in Microcosms and Groundwater, 76 J. Am. Water Works Ass'n 56–59 (1984), and T. M. Vogel & P. L. McCarty, Biotransformation of Tetrachloroethylene to Trichloroethylene, Dichloroethylene, Vinyl Chloride, and Carbon Dioxide under Methanogenic Conditions, 49 Applied Environ. Microbiol. 1080–1083 (1985), demonstrated that DCE and VC were generated during biodegradation of PCE under anaerobic conditions. Finally, Freedman and Gossett, supra, reported complete dechlorination of PCE to ethylene as follows: PCE→TCE→DCE→VC→ ethylene. In each step of the process the compound was reduced (gaining two electrons) through substitution of a chlorine atom by a hydrogen atom. Hence this degradation pathway is often referred to as reductive dechlorination.

In the reductive dechlorination process, chloroethenes act as electron acceptors. This implies that the process can be limited in the field by the availability of sufficient suitable electron donors. In fact, reductive dechlorination also can be totally or partially inhibited by the presence of competing inorganic electron acceptors, such as oxygen, nitrate, iron, and sulfate. It is now widely accepted that reductive dechlorination occurs to some extent at most field sites where chloroethene contamination exists in the presence of a sufficient supply of electron donors (P. L. McCarty, Biotic and Abiotic Transformations of Chlorinated Solvents in Groundwater, in Symposium on Natural Attenuation of Chlorinated Organics in Ground Water 5–9 (Office of Research and Development, U.S. Environmental Protection Agency, Washington, D.C., EPA/540/R-96/509, 1996); J. M. Gossett & S. H. Zinder, Microbiological Aspects Relevant to Natural Attenuation of Chlorinated Ethenes, in Symposium on Natural Attenuation of Chlorinated Organics in Ground Water 10–13 (Office of Research and Development, U.S. Environmental Protection Agency, Washington, D.C., EPA/540/R-96/509, 1996); T. H. Wiedemeier et al., Technical Protocol for Evaluating Natural Attenuation of Chlorinated Solvents in Groundwater, Draft-Revision 1 (Air Force Center for Environmental Excellence, Technology Transfer Division, Brooks Air Force Base, San Antonio, Tex., 1997).

Many oxidizable organic compounds potentially could make suitable electron donors. For a potential electron donor to be useful as an amendment for enhanced in situ bioremediation, however, it must be safe to use, facilitate the desired reaction, and be relatively inexpensive. Lactate is a potential electron donor having these properties. It is innocuous enough for use in the food and medical industries. It has been demonstrated to facilitate reductive dechlorination of chlorinated solvents in several laboratory studies (e.g., W. P. DeBruin et al., Complete Biological Reductive Transformation of Tetrachloroethylene to Ethane, 58 Applied Environ. Microbiol. 1996–2000 (1992); S. A. Gibson & G. W. Sewell, Stimulation of Reductive Dechlorination of Tetrachloroethene in Anaerobic Aquifer Microcosms by Addition of Short-Chain Organic Acids or Alcohols 1392–1393 (1992), D. E. Fennel et al., Comparison of Butyric Acid, Ethanol, Lactic Acid, and Propionic Acid as Hydrogen Donors for Reductive Dechlorination of Tetrachloroethene, 31 Environ. Sci. Technol. 918–926 (1997). The cost-effectiveness of lactate has not been thoroughly evaluated, but preliminary testing suggests that it will be at least as cost-effective as other in situ remediation technologies.

While the use of lactate as an electron donor to facilitate reductive dechlorination is well-established, it has only been applied for remediation of aqueous-phase contaminants because of the perception that bioremediation does not significantly enhance mass transfer of contaminants from the nonaqueous phase. It is shown herein, however, that the addition of high concentrations of a lactate solution not only facilitates reductive dechlorination of aqueous chloroethenes, but also significantly enhances mass transfer of nonaqueous contaminants, making them highly bioavailable. As used herein, "high concentrations" means high relative to the stoichiometric requirement for electron donor to degrade TCE to ethene. Thus, "high concentrations" means about 3–5 orders of magnitude greater than such stoichiometric requirements.

Facilitated transport and enhanced bioavailability of nonaqueous chlorinated solvents through addition of high concentrations of an appropriate electron donor, according to the present invention, take advantage of the natural processes that have made natural attenuation so popular, while also significantly reducing source longevity by enhancing mass transfer to the aqueous phase. The capital costs of the approach are minimal, because only a simple, potentially portable, injection system and monitoring wells are required. Initial mass removal may be slower than some of the other technologies, but it is sustainable for a relatively low cost and requires no extraction of contaminated ground water except for routine monitoring.

High concentrations of lactate, for example, not only provide an electron donor to expedite reductive dechlorination, but also facilitate mass transfer of the nonaqueous chlorinated solvents into the aqueous phase in a manner that makes them highly bioavailable. The lactate appears to act as a surfactant or co-solvent that brings nonaqueous chlorinated solvents into solution. The intimate contact of the chlorinated solvents (electron acceptors) in solution with the lactate (electron donor) enhances bioavailability and leads to rapid biodegradation. The depletion of the residual contamination source is potentially greatly accelerated due to the surfactant or co-solvent effect. The use of lactate to facilitate transport of chlorinated solvents into the aqueous phase and dramatically increase their bioavailability opens up a wide range of applications for enhanced in situ bioremediation of chlorinated solvents present as nonaqueous phase liquids at residual saturation in ground water. The use of a relatively inexpensive compound that accomplishes the same thing as mild surfactants or co-solvents, but does not require extraction and aboveground treatment, combines the advantages of mass removal with those of enhanced bioremediation.

All of the advantages of bioremediation, such as low capital cost, in situ contaminant destruction, unobtrusive appearance, public acceptance, low maintenance requirements, and the like, can be applied to residual source areas because, using this process, source longevity can potentially be greatly reduced. Many of these benefits are enjoyed by owners of contaminated sites, but reduced risk of further releases of contaminants to the public and the environment is also important.

The most appropriate application of this process is to sites with residual chlorinated solvent source areas in the subsurface, comprising primarily nonaqueous contaminants at residual saturation. These are common at both federal and industrial facilities. When very large, mobile DNAPL pools are present, mass transfer rates may be too slow to effect remediation in a reasonable time frame, and more aggressive, capital-intensive approaches may be warranted.

EXAMPLE 1

Figure 2:
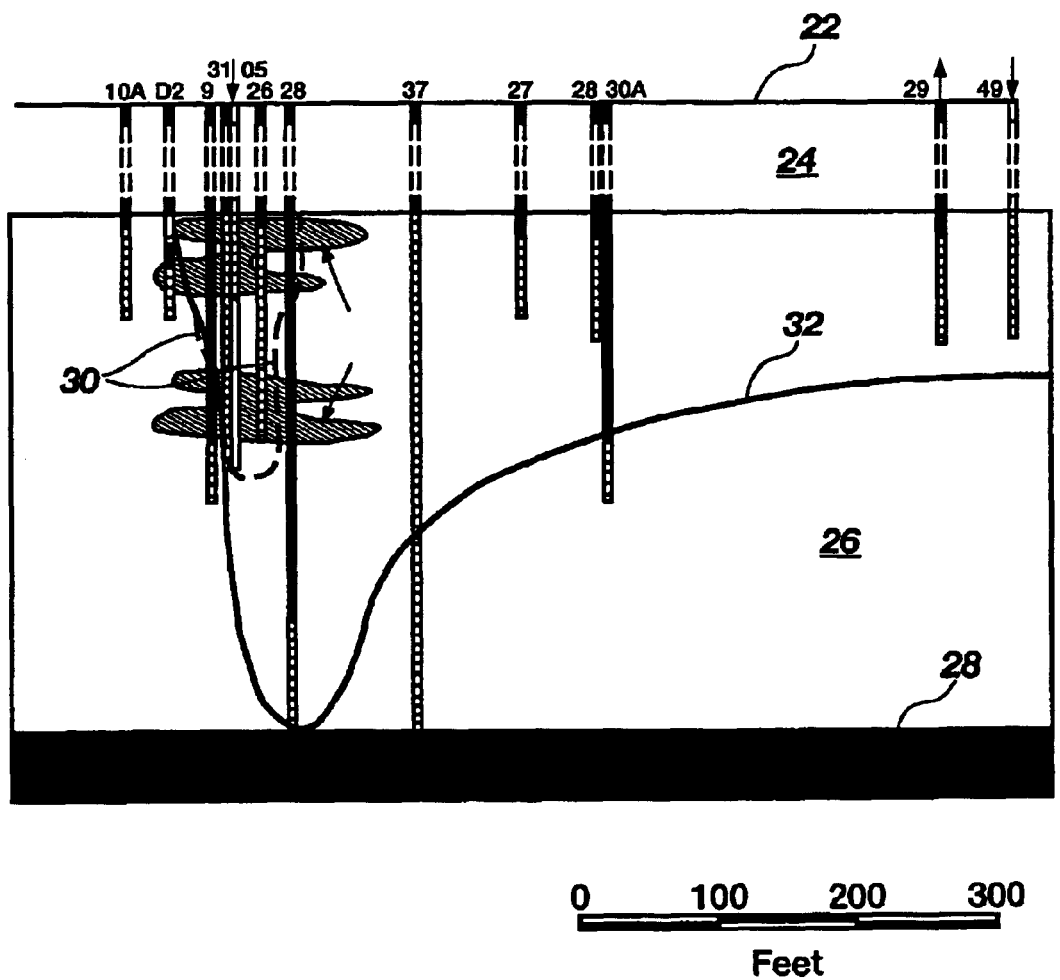
FIG. 2 is a cross section of Test Area North showing the locations and relative depths of injections wells (open bars), monitoring wells (closed bars), and open or screened intervals (hatched bars).

A 1-year field evaluation of enhanced in situ bioremediation was performed at Test Area North ("TAN") of the Idaho National Engineering and Environmental Laboratory. FIG. 1 shows a site plan of TAN, wherein solid symbols represent monitoring wells (10) and open symbols represent injection wells (12). The locations of a 5,000 $\mu$g/L TCE isopleth (14); 1,000 $\mu$g/L TCE isopleth (16); 100 $\mu$g/L TCE isopleth (18); and 5 $\mu$g/L TCE isopleth (20) are shown by solid lines. FIG. 2 illustrates a cross section of this site, showing the surface of the ground (22), an approximately 63-m (210-feet) fractured basalt unsaturation zone (24) (not drawn to scale), an approximately 60-m (200-feet) fractured basalt aquifer (26), and an impermeable clay interbed (28). The approximate location of the TCE secondary source (30) and the 1,000 $\mu$g/L TCE isopleth (32) are also indicated. The test was performed to determine whether this technology has the potential to enhance or replace the default pump-and-treat remedy selected for the contaminant source area in the site's Record of Decision. The residual source of chloroethenes (30), primarily TCE with some PCE and DCE, is present in the fractured basalt aquifer at the site, about 60 to 120 m below land surface. The residual source area (30) is approximately 60 m in diameter, and the TCE plume emanating from the this source is approximately 3 km long. Based on results of published studies and site-specific laboratory studies (K. S. Sorenson, Design of a Field-Scale Enhanced In Situ Bioremediation Evaluation for Trichloroethene in Ground Water at the Idaho National Engineering and Environmental Laboratory, ASAE, St. Joseph, Michigan, Paper No. PNW98-113 (1998)), sodium lactate was chosen as the electron donor and was injected in Well TSF-05 in concentrations ranging from 3% to 60% by weight (Table 2).

The initial electron donor addition strategy involved continuous injection of potable water at 37.85 liters/minute (10 gpm) into Well TSF-05. The electron donor was to be pulsed into this line biweekly. The potable water injection began on Nov. 16, 1998, at the beginning of the startup sampling period. Potable water injection was discontinued on Dec. 11, 1998, due to a significant depression of chlorinated ethene concentrations near the injection well. It was determined that the continuous injection of clean water at 37.85 liters/minute (10 gpm) overwhelmed the flux of contaminants from the secondary source. This condition was considered undesirable for evaluation of an in situ technology, so the electron donor addition strategy was modified such that potable water was only injected for 1 hour following injection of the electron donor solution to flush the solution into the formation surrounding the injection well. This was intended to prevent significant quantities of electron donor from collecting in the injection well and to help prevent biofouling.

The raw electron donor solution used was food grade sodium lactate. Table 2 presents the injection date, the sodium lactate concentration in percent by weight, the injection rate in units of gallons per minute, the total volume of electron donor injected in gallons, and the volume in gallons of potable water injected at 75.7 liters/minute (20 gpm) to flush the solution into the formation. Lactate injections began on Jan. 7, 1999, and were continued until Sep. 8, 1999. Four injection solution concentrations were used, each being more dilute than the previous solution. The dilutions were made in an effort to keep the lactate in the upper part of the aquifer, reducing density effects that cause the electron donor solution to sink to the base of the aquifer. Because the total mass of lactate was kept constant, and the injection flow rate was not dramatically increased, the duration of injection increased from 30 minutes to 4 hours.

TABLE 2

| Date | Sodium Lactate Concentration (%) | Injection Flow Rate (gpm) | Total Volume Injected (gal) | Potable Water Flush Volume (gal) |
| --- | --- | --- | --- | --- |
| 1/7/1999 | 60 | 10 | 300 | 1,200 |
| 1/12/1999 | 60 | 10 | 300 | 1,200 |
| 1/19/1999 | 60 | 10 | 300 | 1,200 |
| 2/2/1999 | 30 | 20 | 600 | 1,200 |
| 2/9/1999 | 30 | 20 | 600 | 1,200 |
| 2/16/1999 | 30 | 20 | 600 | 1,200 |
| 2/23/1999 | 30 | 20 | 600 | 1,200 |
| 3/2/1999 | 6 | 25 | 1,500 | 1,200 |
| 3/4/1999 | 6 | 25 | 1,500 | 1,200 |
| 3/9/1999 | 6 | 25 | 1,500 | 1,200 |
| 3/11/1999 | 6 | 25 | 1,500 | 1,200 |
| 3/16/1999 | 6 | 25 | 1,500 | 1,200 |
| 3/18/1999 | 6 | 25 | 1,500 | 1,200 |
| 3/23/1999 | 6 | 25 | 1,500 | 1,200 |
| 3/25/1999 | 6 | 25 | 1,500 | 1,200 |
| 3/30/1999 | 6 | 25 | 1,500 | 1,200 |
| 4/1/1999 | 6 | 25 | 1,500 | 1,200 |
| 4/6/1999 | 6 | 25 | 1,500 | 1,200 |
| 4/8/1999 | 6 | 25 | 1,500 | 1,200 |
| 4/13/1999 | 6 | 25 | 1,500 | 1,200 |
| 4/15/1999 | 6 | 25 | 1,500 | 1,200 |
| 4/22/1999 | 6 | 25 | 3,000 | 1,200 |
| 4/28/1999 | 6 | 25 | 3,000 | 1,200 |
| 5/5/1999 | 6 | 25 | 3,000 | 1,200 |
| 5/12/1999 | 6 | 25 | 3,000 | 1,200 |
| 5/19/1999 | 6 | 25 | 3,000 | 1,200 |
| 5/26/1999 | 6 | 25 | 3,000 | 1,200 |
| 6/2/1999 | 6 | 25 | 3,000 | 1,200 |
| 6/9/1999 | 3 | 25 | 6,000 | 1,200 |
| 6/16/1999 | 3 | 25 | 6,000 | 1,200 |
| 6/23/1999 | 3 | 25 | 6,000 | 1,200 |
| 6/30/1999 | 3 | 25 | 6,000 | 1,200 |
| 7/7/1999 | 3 | 25 | 6,000 | 1,200 |
| 7/14/1999 | 3 | 25 | 6,000 | 1,200 |
| 7/21/1999 | 3 | 25 | 6,000 | 1,200 |
| 7/28/1999 | 3 | 25 | 6,000 | 1,200 |
| 8/4/1999 | 3 | 25 | 6,000 | 1,200 |
| 8/11/1999 | 3 | 25 | 6,000 | 1,200 |
| 8/18/1999 | 3 | 25 | 6,000 | 1,200 |
| 8/25/1999 | 3 | 25 | 6,000 | 1,200 |
| 9/1/1999 | 3 | 25 | 6,000 | 1,200 |
| 9/8/1999 | 3 | 25 | 6,000 | 1,200 |

Eleven monitoring wells (i.e., TAN-D2, TAN-9, TAN-10A, TAN-25, TAN-26, TAN-27, TAN-28, TAN-29, TAN-30A, TAN-31, and TAN-37) were sampled biweekly and analyzed for electron donors, biological activity indicators, competing inorganic electron acceptors and their reduced products, chloroethenes, ethene, pH, temperature, and specific conductivity.

Electron Donor Distribution

Figure 3A:
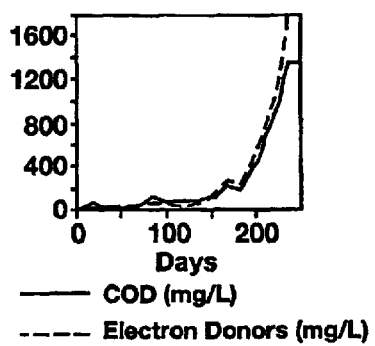
FIGS. 3A–C show the relationship of electron donor concentrations and redox conditions to reductive dechlorination at well TAN-31.

Because concentrated lactate solutions are denser than water, their injection into an aquifer can cause density-driven flow downward in the aquifer. At TAN, some density-driven flow was desirable during lactate addition because the zone to be treated was approximately 60 m thick but the injection well (TSF-05) was completed only in the upper 30 m. It was apparent after the first month of injections, however, that too much of the lactate solution was moving into the lower half of the zone before spreading horizontally in the upper half of the zone. For this reason, the concentration of the lactate was reduced and the injection duration was increased in steps over several months. The importance of the lactate addition strategy can be seen in well TAN-31, a cross-gradient well completed in the upper half of the treatment zone approximately 15 m from the injection well (FIG. 3A). The increasing lactate concentrations after 150 days correspond to the third (and final) step in changing the injection strategy.

Redox Conditions and Reductive Dechlorination

Figure 3B:
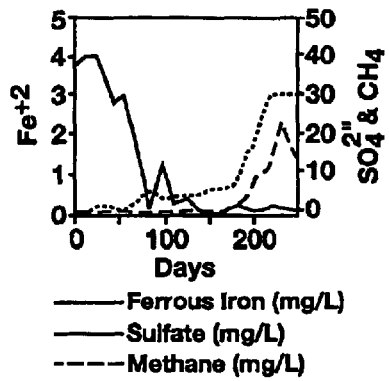
Figure 3C:
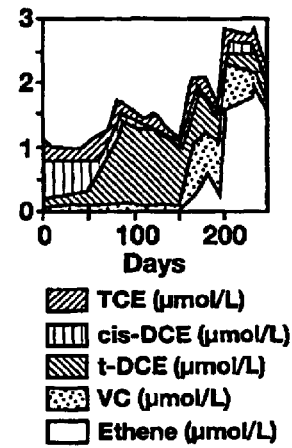

The effect of lactate addition on redox conditions, and ultimately on reductive dechlorination, is evident in FIGS. 3A–C. Sulfate reduction actually began at the fairly modest lactate concentrations in well TAN-31 during the first 100 days of the test, with minor iron reduction evident from increasing ferrous iron concentrations (FIG. 3B). After sulfate was depleted, TCE transformation to cis-1,2-dichloroethene (cis-DCE) began (FIG. 3C). Reductive dechlorination stopped at cis-DCE until the lactate concentrations increased after 150 days and methanogenesis began. Transformation of cis-DCE to vinyl chloride and ethene coincided almost exactly with the onset of methanogenesis. Beyond about 200 days from the start of the test, ethene was by far the largest constituent at this sampling location.

Enhanced reductive dechlorination of TCE to ethene was observed in all wells receiving significant lactate concentrations.

Based on the results of the field evaluation, enhanced in situ bioremediation was selected to replace pump-and-treat for remediation of the residual contaminant source area at Test Area North. Of particular importance in the decision process was the fact that the process was effective not only for degrading chlorinated solvents in the aqueous phase, but also that the process seemed to have a significant impact on the residual source itself.

Enhanced Bioavailability

Figure 4:
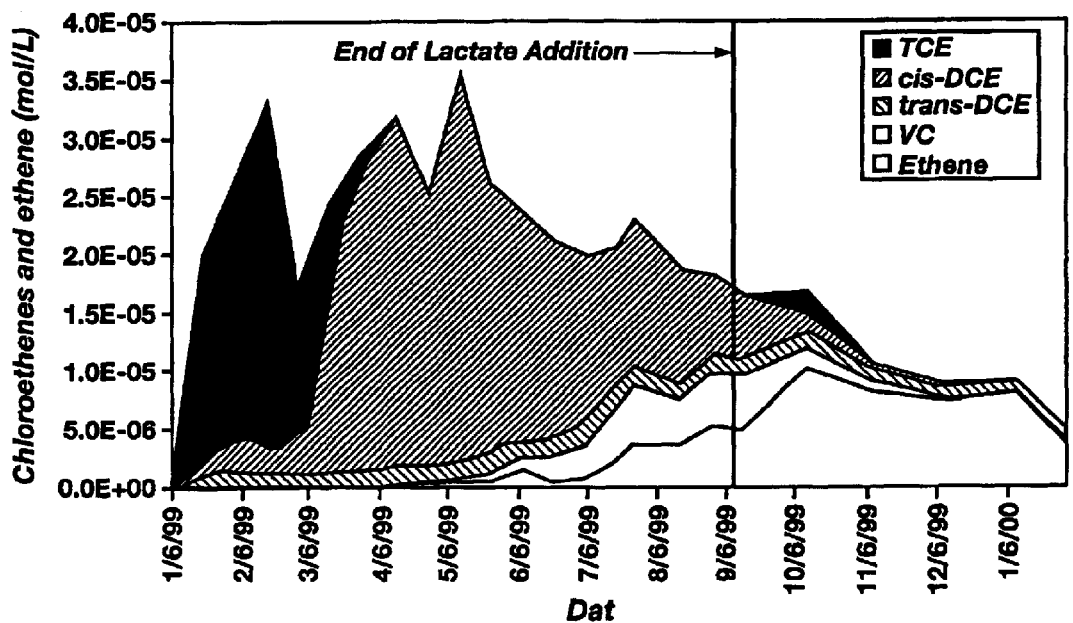
FIG. 4 shows facilitated TCE transport and subsequent biodegradation in well TAN-26.

A surprising observation during the field evaluation was a dramatic increase in TCE concentrations deep in the aquifer soon after sodium lactate addition began (FIG. 4). The TCE increase appeared to occur essentially simultaneously with the arrival of the highly concentrated electron donor solution. In addition, the peak TCE concentration was actually significantly higher than historical measurements for well TAN-26. These observations strongly suggest that the transport of TCE to well TAN-26 was associated with the downward migration of the electron donor. This could occur through two mechanisms. One possible explanation for the large, rapid increase in TCE concentrations is that the lactate solution simply pushed secondary source material along in front of it as it migrated out from well TAN-05, through the secondary source, and down toward well TAN-26. However, tritium was a co-contaminant in the residual source material, and consideration of the tritium data in well TAN-26 appears to rule out this possibility. In fact, tritium concentrations were completely unaffected in spite of large increases in organic contaminant concentrations (TCE and DCE).

A second possible explanation for increased TCE concentrations in well TAN-26 is that the lactate injection led to facilitated transport of the organic contaminants. Three hypotheses that could explain facilitated transport are as follows: (1) that the lactate solution acts as a co-solvent for the organic contaminants, (2) that the lactate acts as a surfactant, and (3) that the lactate solution, because of its high concentration, displaces sorbed chlorinated ethenes, driving them into solution. All of these mechanisms would result in facilitated transport of the chlorinated ethenes in intimate contact with the lactate solution and would make more of the chlorinated ethenes bioavailable. The behavior of the TCE in well TAN-26 after the peak concentration suggests that it was, in fact, extremely bioavailable. The drop in TCE concentration from the peak concentration to undetectable levels occurred with a TCE half-life of less than 20 days (assuming first-order kinetics for illustration). Just as important for the facilitated transport hypothesis, cis-DCE increased to a peak concentration within 20% of the peak TCE concentration (indicating an excellent mass balance), and then remained elevated near that peak concentration. The significance of this point is that the lactate injection was continuing, so if the hypothesis were valid it would be expected to continue bringing the organic contaminants with it as it migrated through the secondary source. After biological activity increased, the TCE was transformed to cis-DCE before reaching well TAN-26, but as shown in FIG. 4, the total ethene level remained approximately constant. After several months the total ethene concentration dropped, but this was expected (and intentional) because the lactate solution concentration had been reduced by a factor of 20 in June. This change reduced the density of the solution significantly, so less lactate, and therefore less total ethenes, was transported to well TAN-26. Thus, the concentration decrease supports the hypothesis of facilitated transport.

The facilitated transport makes available for reductive dechlorination large quantities of the chlorinated ethenes that otherwise would remain associated with the secondary source. As shown by the well TAN-26 data, once made available by the lactate solution, the TCE was, in fact, rapidly degraded. Enhanced bioavailability of chlorinated ethenes in the secondary source would greatly decrease the longevity of the source.

EXAMPLE 2

Based on the field results presented in Example 1, laboratory studies were preformed to confirm that the enhanced bioavailability of TCE observed in the field was due to co-solvent or surfactant behavior resulting from the use of high concentrations of sodium lactate. Two fundamental properties used to screen the co-solvent or surfactant properties of a solution are surface tension and interfacial tension. Surface tension measures the force per unit length along the interface between a liquid and air due to its tension. When a co-solvent or surfactant is present in an aqueous liquid at increasing concentrations, the surface tension of that liquid decreases. Interfacial tension is similar to surface tension except that it measures the force per unit length along the interface between two liquid phases arising from the surface free energy. The higher the interfacial tension between two liquids, the less likely one is to dissolve into the other, and the more difficult it is for one to be transported within the other. Thus, perhaps the most significant property of co-solvents and surfactants in the context of chlorinated solvent remediation is that they decrease the interfacial tension between the aqueous phase (groundwater) and the organic nonaqueous phase so that the solubility (or mobility for order-of-magnitude decreases) of the nonaqueous phase is enhanced.

The laboratory study performed to confirm the co-solvent properties of the high concentration electron donor solution measured the surface tension of electron donor solutions at various concentrations. Next, interfacial tensions between the same electron donor solutions and nonaqueous phase TCE were measured. Two types of electron donor solutions were used. The first was different concentrations of sodium lactate, the electron donor used in Example 1. The second was various mixtures of sodium lactate and ethyl lactate. Ethyl lactate was chosen because it is a lactate-based compound that is used in some industries as a solvent. Thus it was believed ethyl lactate might further enhance the co-solvent behavior observed, while still acting as a suitable electron donor for bioremediation. It is believed that mixtures of sodium lactate and ethyl lactate have never before been used for bioremediation. Surface and interfacial tension measurements were made using the pendant drop method (M. J. Rosen, ed., Structure/Performance Relationships in Surfactants, American Chemical Society, Washington D.C. 329 (1984); R. D. Bagnall & P. A. Arundel, The Profile Area of Pendant Drops, 82 J. Phys. Chem. 898 (1978)) coupled with real-time video imaging (M. D. Herd et al., Interfacial Tensions of Microbial Surfactants Determined by Real-Time Video Imaging of Pendant Drops, Proceedings paper number SPE/DOE 24206 513–519, SPE/DOE Eighth Symposium on Enhanced Oil Recovery, Tulsa, Okla. (1992)).

Figure 5:
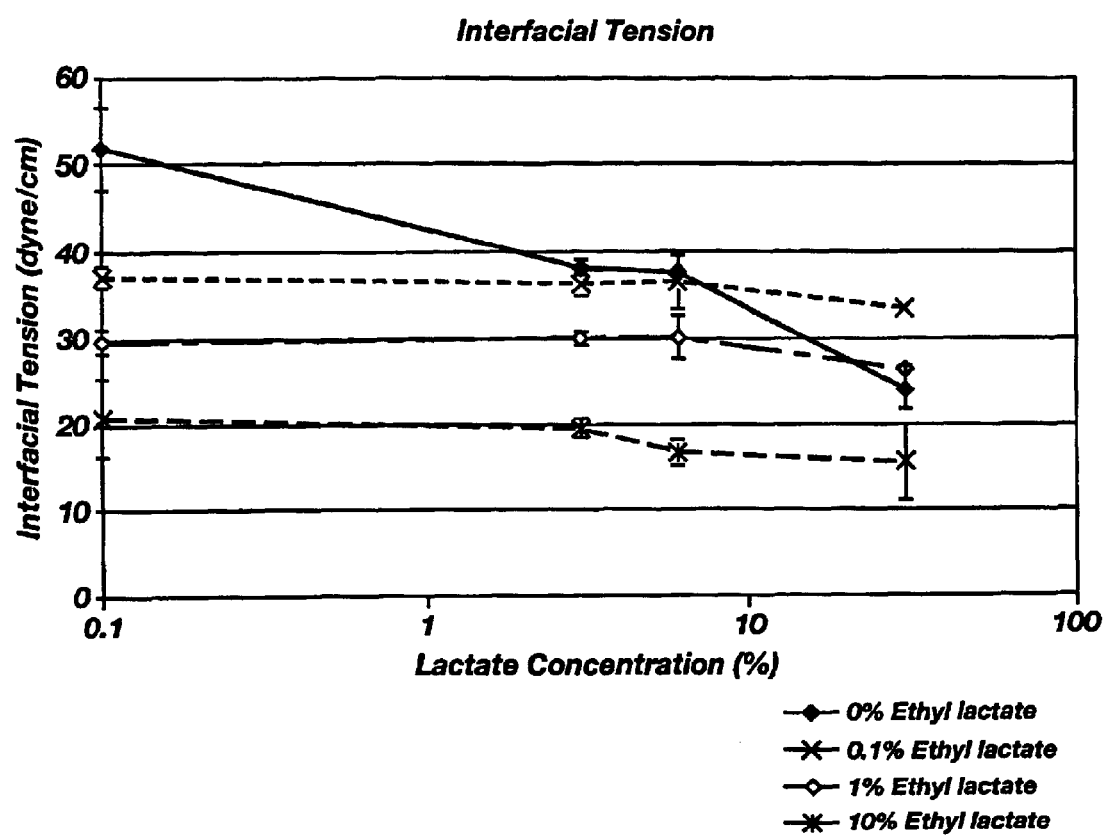
FIG. 5 shows surface tension as a function of lactate concentration for sodium lactate solutions without added ethyl lactate (♦) and with 0.1% ethyl lactate (X), 1% ethyl lactate (◊), and 10% ethyl lactate (*); error bars represent two standard deviations around the mean.

The results of the surface tension experiment are shown in FIG. 5. Surface tension is plotted on the vertical axis, while sodium lactate concentration for each solution is plotted on the horizontal axis. The different lines on the plot are for different concentrations of ethyl lactate ranging from 0 to 10% mixed with the sodium lactate solution. Error bars represent two standard deviations around the mean. Examination of the 0% ethyl lactate line (sodium lactate only) reveals that at sodium lactate concentrations from 0.01 to 7%, almost no change in surface tension occurred. As the concentration was increased to 30 and 60%, however, a dramatic decrease in the surface tension was measured. This result confirms that sodium lactate begins to exhibit co-solvent properties at high concentrations. These concentrations are about 3 orders of magnitude higher than reported in other studies, which explains the surprising results discussed in Example 1.

In an effort to decrease the sodium lactate concentrations required to lower the surface tension of the solution, mixtures with ethyl lactate were evaluated. As seen in FIG. 5, the addition of 1% and 10% ethyl lactate to the different sodium lactate solutions had a pronounced effect on the solution's surface tension. Thus, the addition of ethyl lactate to the sodium lactate electron donor solution enhances its co-solvent properties. The choice of optimum concentration would be a matter of design for a specific remediation. If only slightly enhanced bioavailability of the solvents were desired, the high concentration sodium lactate solution would be appropriate. If a large degree of enhanced bioavailability were desired, the addition of 1 to 10% ethyl lactate would be appropriate.

Figure 6:
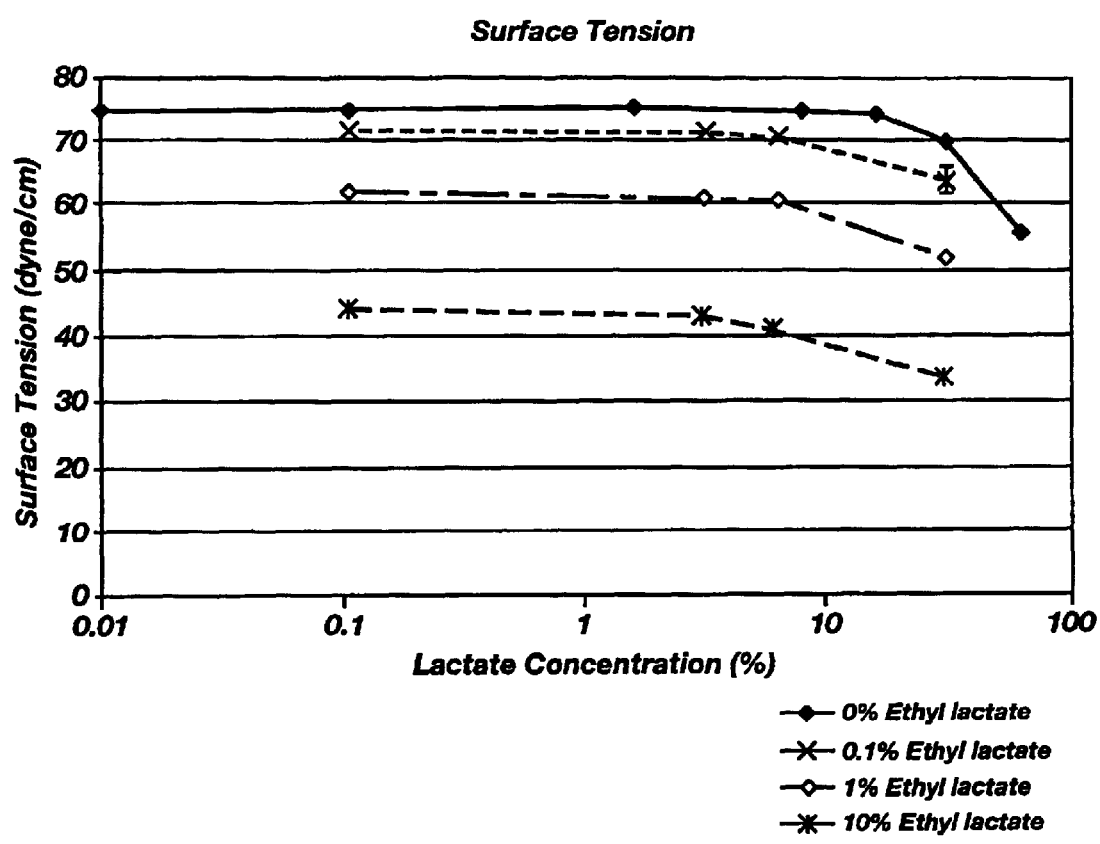
FIG. 6 shows interfacial tension as a function of lactate concentration for sodium lactate solutions without added ethyl lactate (♦) and with 0.1% ethyl lactate (X), 1% ethyl lactate (◊), and 10% ethyl lactate (*); error bars represent two standard deviations around the mean.

The results of the interfacial tension measurements are shown in FIG. 6. As before, error bars represent two standard deviations around the mean. For 0% ethyl lactate (sodium lactate only), the effect of increasing sodium lactate concentration occurs at lower concentrations for interfacial tension than observed in the surface tension measurements. Interfacial tension decreased by about 26% when sodium lactate was increased from 0.1 to 3% (still 2 orders of magnitude above previous studies). When sodium lactate was increased to 30%, the interfacial tension was decreased to 47% of the value at a sodium lactate concentration of 0.1%. Again, the importance of high sodium lactate concentrations for achieving the co-solvent properties is apparent.

As ethyl lactate was added to the sodium lactate solutions, it is clear that the ethyl lactate concentration is the primary factor affecting interfacial tension. FIG. 6 shows that the interfacial tension becomes relatively insensitive to sodium lactate concentration for the ethyl lactate mixtures. From a remediation design standpoint, this simplifies things because co-solvent effects appear to be affected by only one component of the mixture. Interestingly, only the 10% ethyl lactate mixture displayed lower surface tensions than the 30% sodium lactate solution with no ethyl lactate.

I claim:

1. A method for enhancing in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein said electron donor comprises a mixture of (a) a member selected from the group consisting of $C_2$–$C_4$ carboxylic acids and salts thereof, $C_2$–$C_4$ hydroxy acids and salts thereof, and mixtures thereof, and (b) a member selected from the group consisting of esters of $C_2$–$C_4$ carboxylic acids, esters of $C_2$–$C_4$ hydroxy acids, and mixtures thereof.

2. The method of claim 1 wherein said electron donor comprises a mixture of lactic acid or a salt thereof and an ester of lactic acid.

3. The method of claim 2 wherein said salt of lactic acid is a member selected from the group consisting of sodium lactate, potassium lactate, lithium lactate, ammonium lactate, calcium lactate, magnesium lactate, manganese lactate, zinc lactate, ferrous lactate, aluminum lactate, and mixtures thereof.

4. The method of claim 1 wherein said electron donor comprises a mixture of sodium lactate and ethyl lactate.

5. The method of claim 1 wherein said microbe is indigenous to the ground water.

6. The method of claim 1 further comprising adding the halo-respiring microbe to the ground water.

7. The method of claim 1 wherein said electron donor comprises 3% to 60% by weight of the member selected from the group consisting of $C_2$–$C_4$ carboxylic acids and salts thereof, $C_2$–$C_4$ hydroxy acids and salts thereof, and mixtures thereof.

8. The method of claim 1 wherein said electron donor comprises a mixture of propionic acid or salt thereof, lactic acid or salt thereof, and an ester of lactic acid.

9. The method of claim 8 wherein said ester of lactic acid comprises ethyl lactate.

10. The method of claim 1 wherein said electron donor comprises a mixture of butyric acid or salt thereof, lactic acid or salt thereof, and an ester of lactic acid.

11. The method of claim 10 wherein said ester of lactic acid comprises ethyl lactate.

12. The method of claim 1 wherein said electron donor comprises a mixture of propionic acid and ethyl lactate.

13. The method of claim 1 wherein said electron donor comprises a mixture of butyric acid and ethyl lactate.

14. The method of claim 1 wherein said electron donor comprises 0.1 to 10% by weight of the member selected from the group consisting of esters of $C_2$–$C_4$ carboxylic acids, esters of $C_2$–$C_4$ hydroxy acids, and mixtures thereof.

15. A method for enhancing bioremediation of a nonaqucous chlorinated solvent in ground water comprising adding to the ground water an amount of an electron donor sufficient for a chloro-respiring microbe to use the nonaqueous chlorinated solvent as an electron acceptor, thus reductively dechlorinating the nonaqueous chlorinated solvent into innocuous compounds, wherein said electron donor comprises 3% to 60% by weight of a member selected from the group consisting of $C_2$–$C_4$ carboxylic acid and salts thereof, $C_2$–$C_4$ hydroxy acids and salts thereof, and mixtures thereof.

16. The method of claim 15 wherein said electron donor comprises lactic acid or a salt thereof.

17. The method of claim 16 wherein said salt of lactic acid is a member selected from the group consisting of sodium lactate, potassium lactate, lithium lactate, ammonium lactate, calcium lactate, magnesium lactate, manganese lactate, zinc lactate, ferrous lactate, aluminum lactate, and mixtures thereof.

18. The method of claim 15 wherein said electron donor comprises a mixture of sodium lactate and ethyl lactate.

19. The method of claim 15 wherein said microbe is indigenous to the ground water.

20. The method of claim 15 further comprising adding the chloro-respiring microbe to the ground water.

21. The method of claim 15 wherein said member selected from the group consisting of $C_2$–$C_4$ carboxylic acid and salts thereof, $C_2$–$C_4$ hydroxy acids and salts thereof, and mixtures thereof is a mixture of propionic acid or a salt thereof and lactic acid or a salt thereof.

22. The method of claim 15 wherein said member selected from the group consisting of $C_2$–$C_4$ carboxylic acid and salts thereof, $C_2$–$C_4$ hydroxy acids and salts thereof, and mixtures thereof is a mixture of butyric acid or a salt thereof and lactic acid or a salt thereof.

23. The method of claim 15 wherein said member selected from the group consisting of $C_2$–$C_4$ carboxylic acid and salts thereof, $C_2$–$C_4$ hydroxy acids and salts thereof, and mixtures thereof is propionic acid or a salt thereof.

24. The method of claim 15 wherein said member selected from the group consisting of $C_2$–$C_4$ carboxylic acid and salts thereof, $C_2$–$C_4$ hydroxy acids and salts thereof, and mixtures thereof is butyric acid or a salt thereof.

25. The method of claim 15 wherein said electron donor further comprises a member selected from the group consisting of esters of $C_2$–$C_4$ carboxylic acids, esters of $C_2$–$C_4$ hydroxy acids, and mixtures thereof.

26. The method of claim 25 wherein said member selected from the group consisting of esters of $C_2$–$C_4$ carboxylic acids, esters of $C_2$–$C_4$ hydroxy acids, and mixtures thereof is an ester of lactic acid.

27. The method of claim 26 wherein said ester of lactic acid is ethyl lactate.

28. The method of claim 25 wherein said member selected from the group consisting of esters of $C_2$–$C_4$ carboxylic acids, esters of $C_2$–$C_4$ hydroxy acids, and mixtures thereof is present in an amount of 0.1 to 10% by weight.

29. A method for enhancing mass transfer of a nonaqueous halogenated solvent present in a nonaqueous residual source of contamination in ground water, said ground water comprising an aqueous phase, into said aqueous phase comprising adding to said ground water an effective amount of a composition that donates electrons for microbe-mediated reductive dehalogenation of said nonaqueous halogenated solvent into innocuous compounds and functions as a surfactant or co-solvent for solubilizing said nonaqueous halogenated solvent, wherein said composition comprises a mixture of (a) a member selected from the group consisting of $C_2$–$C_4$ carboxylic acid and salts thereof, $C_2$–$C_4$ hydroxy acids and salts thereof, and mixtures thereof and (b) a member selected from the group consisting of esters of $C_2$–$C_4$ carboxylic acids, esters of $C_2$–$C_4$ hydroxy acids, and mixtures thereof.

30. The method of claim 29 wherein said composition comprises a mixture of lactic acid or a salt thereof and a lactate ester.

31. The method of claim 30 wherein said salt of lactic acid is a member selected from the group consisting of sodium lactate, potassium lactate, lithium lactate, ammonium lactate, calcium lactate, magnesium lactate, manganese lactate, zinc lactate, ferrous lactate, aluminum lactate, and mixtures thereof.

32. The method of claim 29 wherein said composition comprises a mixture of sodium lactate and ethyl lactate.

33. The method of claim 29 wherein said microbe is indigenous to the ground water.

34. The method of claim 29 further comprising adding a chloro-respiring microbe to the ground water for mediating said reductive dehalogenation.

35. The method of claim 29 wherein said electron donor comprises 3% to 60% by weight of the member selected from the group consisting of $C_2$–$C_4$ carboxylic acid and salts thereof, $C_2$–$C_4$ hydroxy acids and salts thereof, and mixtures thereof.

36. The method of claim 29 wherein said electron donor comprises a mixture of propionic acid or salt thereof, lactic acid or salt thereof, and an ester of lactic acid.

37. The method of claim 36 wherein said ester of lactic acid comprises ethyl lactate.

38. The method of claim 29 wherein said electron donor comprises a mixture of butyric acid or salt thereof, lactic acid or salt thereof, and an ester of lactic acid.

39. The method of claim 38 wherein said ester of lactic acid comprises ethyl lactate.

40. The method of claim 29 wherein said electron donor comprises a mixture of propionic acid or salt thereof and ethyl lactate.

41. The method of claim 29 wherein said electron donor comprises a mixture of butyric acid or a salt thereof and ethyl lactate.

42. The method of claim 29 wherein said electron donor comprises 0.1 to 10% by weight of the member selected from the group consisting of esters of $C_2$–$C_4$ carboxylic acids, esters of $C_2$–$C_4$ hydroxy acids, and mixtures thereof.

43. A method for enhancing mass transfer of a nonaqueous halogenated solvent present in a nonaqueous residual source of contamination in ground water, said ground water comprising an aqueous phase, into said aqueous phase comprising adding to said ground water an effective amount of a composition that donates electrons for microbe-mediated reductive dehalogenation of said nonaqueous halogenated solvent into innocuous compounds and functions as a surfactant or co-solvent for solubilizing said nonaqueous halogenated solvent, wherein said composition comprises 3% to 60% by weight of a member selected from the group consisting of $C_2$–$C_4$ carboxylic acid and salts thereof, $C_2$–$C_4$ hydroxy acids and salts thereof, and mixtures thereof.

44. The method of claim 43 wherein said electron donor comprises lactic acid or a salt thereof.

45. The method of claim 44 wherein said salt of lactic acid is a member selected from the group consisting of sodium lactate, potassium lactate, lithium lactate, ammonium lactate, calcium lactate, magnesium lactate, manganese lactate, zinc lactate, ferrous lactate, aluminum lactate, and mixtures thereof.

46. The method of claim 43 wherein said electron donor comprises a mixture of sodium lactate and ethyl lactate.

47. The method of claim 43 wherein said member selected from the group consisting of $C_2$–$C_4$ carboxylic acid and salts thereof, $C_2$–$C_4$ hydroxy acids and salts thereof, and mixtures thereof is a mixture of propionic acid or a salt thereof and lactic acid or a salt thereof.

48. The method of claim 43 wherein said member selected from the group consisting of $C_2$–$C_4$ carboxylic acid and salts thereof, $C_2$–$C_4$ hydroxy acids and salts thereof, and mixtures thereof is a mixture of butyric acid or a salt thereof and lactic acid or a salt thereof.

49. The method of claim 43 wherein said electron donor further comprises a member selected from the group consisting of esters of $C_2$–$C_4$ carboxylic acids, esters of $C_2$–$C_4$ hydroxy acids, and mixtures thereof.

50. The method of claim 49 wherein said member selected from the group consisting of esters of $C_2$–$C_4$ carboxylic acids, esters of $C_2$–$C_4$ hydroxy acids, and mixtures thereof is an ester of lactic acid.

51. The method of claim 50 wherein said ester of lactic acid is ethyl lactate.

52. The method of claim 49 wherein said member selected from the group consisting of esters of $C_2$–$C_4$ carboxylic acids, esters of $C_2$–$C_4$ hydroxy acids, and mixtures thereof is present in an amount of 0.1 to 10% by weight.

* * * * *